W. BRUNTON.
COMBINED VALVE AND TRAP.
APPLICATION FILED OCT. 22, 1910.
1,004,239.
Patented Sept. 26, 1911.
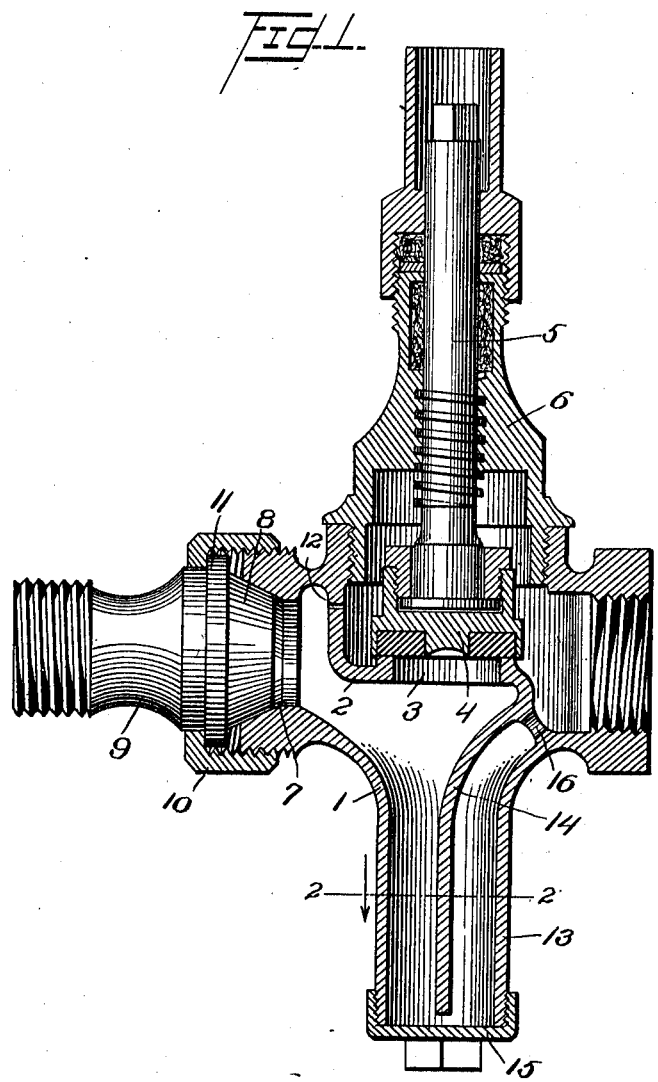
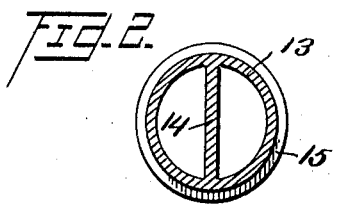
Witnesses
H. Strauss
R. N. Krenkel
Inventor
William Brunton,
By Joshua R. H. Potts,
Attorney

UNITED STATES PATENT OFFICE.

WILLIAM BRUNTON, OF ELWYN, PENNSYLVANIA.

COMBINED VALVE AND TRAP.

1,004,239.  Specification of Letters Patent. Patented Sept. 26, 1911.

Application filed October 22, 1910. Serial No. 588,506.

*To all whom it may concern:*

Be it known that I, WILLIAM BRUNTON, a citizen of the United States, residing at Elwyn, in the county of Delaware and State of Pennsylvania, have invented certain new and useful Improvements in Combined Valves and Traps, of which the following is a specification.

My invention relates to improvements in combined valves and traps, which are particularly designed for use in connection with vacuum steam heating systems, the objects of the invention being to permit the trapping of the water of condensation, and allow the same to escape without interfering with the heating system.

A further and particular object of my invention is to provide a device of the class mentioned which is adapted for use with either gravity or vacuum systems.

A further object is to provide a device of this character which combines in a single casing a valved opening, and a trap, which is of extremely simple construction, strong and durable in use.

With these and other objects in view, the invention consists in certain novel features of construction and combinations and arrangements of parts, as will be more fully hereinafter described and pointed out in the claim.

In the accompanying drawings: Figure 1, is a view in longitudinal section, illustrating my improvements, and Fig. 2, is a view in section on the line 2—2 of Fig. 1.

1, represents the valve casing provided with the ordinary partition 2, the latter having an opening or passage 3 normally closed by a valve 4. This valve 4 is of the ordinary type, is normally closed but may be opened by means of the screw-threaded stem 5, which is threaded in the dome or hood 6, and is suitably packed and protected as shown. The particular form of valve, however, forms no part of the present invention, and hence the details of construction are not material.

Casing 1, at one end, is externally screw-threaded, and internally beveled as shown at 7, forming a conical opening for the reception of the conical end 8 of a coupling 9, the latter adapted to be screwed into the ordinary radiator. This coupling 9 is secured to the casing 1 by means of a union 10, which bears against an annular flange 11 on the coupling, and tightly presses the conical end 8 into the beveled opening 7, insuring a perfectly steam tight joint.

Partition 2 is provided with a small opening 12, through which the proper suction may be had to maintain the desired vacuum or partial vacuum in the system. The lower end of casing 1 depends in cylindrical form constituting a trap 13 into which a longitudinal partition 14 projects from partition 2 to a point adjacent the lower end of the trap 13, said lower end of the trap externally screw-threaded for the reception of a removable cap 15. In partition 2, between partition 14 and one wall of the trap, an opening 16 is provided for the passage of water of condensation.

In operation, as the water condenses in the radiator, it finds its way into the trap 13, passing down one side of the trap and up the other, and overflowing through opening 16 into the pipe line of the system. This water of condensation in the trap constitutes a seal compelling all suction to be through the small opening 12, and the trap may be readily cleaned out from time to time by simply removing cap 15.

By reason of a combined valve casing and trap in connection with steam heating systems, the system may be used as a vacuum heating system or as a gravity system. When the valve is opened, the device will operate as an ordinary gravity return system. When the valve is closed, the system will operate as a vacuum system. This has great advantage, for the greater portion of the time, it will operate as a vacuum system but if anything should happen to the pump, the valve could be opened and the device will then operate as a gravity return system until the pump is repaired.

The valve 4 is maintained in closed position except at such times when the pressure in the system is very low or the pumps out of order. When the valve is closed and there is sufficient pressure in the system, the steam will pass through the small opening 12 and if the pressure be increased above that of the water column in the trap a portion of the steam will escape through the trap and the restricted opening at the outlet thereof, which outlet also serves as an escape for an excess of water of condensation. If the pressure in the system is reduced below normal the opening 12 is insufficient to maintain adequate circulation of steam and the column of water in the trap would prevent the circulation through the same. At such times the valve is opened in order to give an unrestricted passage for the steam, whereby the device may operate as a gravity return system until the normal pressure can be restored, after which the valve is closed.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A valve casing having an inlet and an outlet, a partition in said casing, a trap extending downwardly from said casing, one side of said trap communicating with said inlet and the other side thereof with said outlet, said partition being provided with a valve controlled opening forming a communication between said inlet and said outlet independently of said trap when operating as a gravity return system, and said partition being also provided with a relatively small aperture through which suction is maintained through the device when operating as a vacuum system, substantially as described.

In testimony whereof I have signed my name to this specification in the presence of two subscribing witnesses.

WILLIAM BRUNTON.

Witnesses:
R. H. KRENKEL,
CHAS. E. POTTS.

---

Copies of this patent may be obtained for five cents each, by addressing the "Commissioner of Patents, Washington, D. C."